(12) United States Patent
Kim et al.

(10) Patent No.: US 9,467,357 B2
(45) Date of Patent: Oct. 11, 2016

(54) METHOD FOR POWER SAVE MODE OPERATION IN WIRELESS LOCAL AREA NETWORK AND APPARATUS FOR THE SAME

(71) Applicant: LG ELECTRONICS INC., Seoul (KR)

(72) Inventors: Suh Wook Kim, Anyang-si (KR); Yong Ho Seok, Anyang-si (KR); Bong Hoe Kim, Anyang-si (KR); Dae Won Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/845,707

(22) Filed: Sep. 4, 2015

(65) Prior Publication Data
US 2016/0006627 A1    Jan. 7, 2016

Related U.S. Application Data

(63) Continuation of application No. 13/992,145, filed as application No. PCT/KR2011/007502 on Oct. 11, 2011, now Pat. No. 9,161,305.

(60) Provisional application No. 61/420,328, filed on Dec. 7, 2010, provisional application No. 61/424,678, filed on Dec. 20, 2010.

(51) Int. Cl.
| | | |
|---|---|---|
| *H04W 72/04* | (2009.01) | |
| *H04L 5/00* | (2006.01) | |
| *H04L 12/26* | (2006.01) | |
| *H04W 52/02* | (2009.01) | |
| *H04W 76/04* | (2009.01) | |
| *H04W 84/12* | (2009.01) | |

(52) U.S. Cl.
CPC ........ *H04L 43/062* (2013.01); *H04W 52/0206* (2013.01); *H04W 52/0229* (2013.01); *H04W 76/048* (2013.01); *H04W 84/12* (2013.01); *Y02B 60/50* (2013.01)

(58) Field of Classification Search
CPC .... H04W 72/042; H04L 5/001; H04L 5/003; H04L 5/0053; H04L 5/0098
USPC .................................. 370/328, 329
See application file for complete search history.

(56) References Cited

U.S. PATENT DOCUMENTS

2008/0192691 A1* 8/2008 Park ................... G01D 5/34723
370/331

FOREIGN PATENT DOCUMENTS

| KR | 10-2005-0024760 A | 3/2005 |
| KR | 10-2006-0025444 A | 3/2006 |
| KR | 1020070008679 A | 1/2007 |
| KR | 10-2008-0083086 A | 9/2008 |

* cited by examiner

*Primary Examiner* — Ronald B Abelson
(74) *Attorney, Agent, or Firm* — Dentons US LLP (57) ABSTRACT

A method for a power save mode operation in a wireless local area network (WLAN) system is provided. The method comprising determining a type of a receiving station (STA) indicator on the basis of the number of STAs which are associated with the AP and which intend to transmit buffered traffic; generating a traffic indicator map (TIM) element including information which indicates the receiving STA indicator and the type of the receiving STA indicator, transmitting the TIM element, receiving a poll frame for requesting data frame transmission from one STA among the STAs and transmitting the data frame to the STA.

12 Claims, 10 Drawing Sheets

| Element ID | Length | DTIM Count | DTIM Period | Traffic Control | Traffic Indication |
|---|---|---|---|---|---|
| 310 | 320 | 330 | 340 | 350 | 360 |

| Element ID | Length | DTIM Count | DTIM Period | Traffic Control | DTIM Period for Direct Notification | AID$_i$ | AID$_j$ | ... | AID$_x$ |
|---|---|---|---|---|---|---|---|---|---|
| 810 | 820 | 830 | 840 | 850 | 860 | | | 870 | |

METHOD FOR POWER SAVE MODE OPERATION IN WIRELESS LOCAL AREA NETWORK AND APPARATUS FOR THE SAME

This application is a continuation of U.S. application Ser. No. 13/992,145 filed on Jun. 6, 2013, now allowed; which is a 35 USC §371 National Stage entry of International Application No. PCT/KR2011/007502, filed Oct. 11, 2011, and claims the benefit of U.S. Provisional Application Nos. 61/420,328, filed Dec. 7, 2010 and 61/424,678, filed Dec. 20, 2010, all of which are incorporated by reference in their entirety herein.

TECHNICAL FIELD

The present invention relates to a wireless local area network (WLAN) system, and more particularly, to a method for a power save mode operation of a station (STA).

BACKGROUND ART

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate.

The WLAN system supports an active mode and a power save mode as an operation mode of a station (STA). The active mode implies an operation mode in which the STA operates in an awake state capable of transmitting and receiving a frame. On the other hand, the power save mode is supported for power saving of an STA which does not require the active state to receive the frame. An STA supporting the power save mode (PSM) can avoid unnecessary power consumption by operating in a doze mode when it is not a time duration in which the STA can access to its radio medium. That is, the STA operates in the awake state only for a time duration in which a frame can be transmitted to the STA or a time duration in which the STA can transmit the frame.

In the WLAN system, an access point (AP) manages traffic to be transmitted to STAs that operate in the power save mode. When there is buffered traffic to be transmitted to a specific STA, a method is required in which the AP reports this to the STA and transmits a frame. Further, when the STA operates in the doze state, a method is required in which, if there is buffered traffic for the STA, the STA transitions to the awake state to be able to normally receive the frame.

SUMMARY OF INVENTION

Technical Problem

The present invention provides a method of operating a station (STA) in a power save mode in a wireless local area network (WLAN) system and an apparatus supporting the method.

Solution to Problem

In an aspect, a method performed by an access point for a power save mode operation in a wireless local area network (WLAN) system is provided. The method comprising determining a type of a receiving station (STA) indicator on the basis of the number of STAs which are associated with the AP and which intend to transmit buffered traffic; generating a traffic indicator map (TIM) element including information which indicates the receiving STA indicator and the type of the receiving STA indicator, transmitting the TIM element, receiving a poll frame for requesting data frame transmission from one STA among the STAs and transmitting the data frame to the STA.

If the number of STAs is greater than or equal to a specific threshold, the type of the receiving STA indicator may be a bit sequence type in which the STAs include respective association identifiers (AIDs) as identifiers assigned when associating with the AP.

If the number of STAs is less than the specific threshold, the type of the receiving STA indicator may be a bitmap type in which each of bit orders corresponding to the AIDs of the STAs is set to a specific value.

In the receiving STA indicator of the bit sequence type, bits of which a bit order is less than a minimum AID among the AIDs may be omitted, and the TIM element may further include an offset indicator indicating the number of omitted bits.

The TIM element may be transmitted by being included in a beacon frame transmitted periodically by the AP.

The method may further include receiving, by the AP, an acknowledgement (ACK) frame from the STA in response to the data frame.

In another aspect a wireless apparatus is provided. The apparatus include a transceiver for transmitting and receiving a data frame and a processor operating by being operably coupled to the transceiver. The apparatus is configured for determining a type of a receiving STA indicator on the basis of the number of STAs which are associated with the AP and which intend to transmit buffered traffic, generating a TIM element including information which indicates the receiving STA indicator and the type of the receiving STA indicator, transmitting the TIM element, receiving a poll frame for requesting data frame transmission from one STA among the STAs and transmitting the data frame to the STA.

In still another aspect, a method performed by an AP for a power save mode operation in a WLAN system is provided. The method includes switching an operation state to an awake state to receive a TIM element including a receiving STA indicator, receiving the TIM element from the AP, determining whether there is buffered traffic for the STA on the basis of the receiving STA indicator, requesting the AP to transmit a data frame when there is the buffered traffic for the STA and receiving the data frame from the AP after receiving of the poll frame.

The TIM element may further include type indication information of the receiving STA indicator and the type indication information of the receiving STA indicator may indicate either a bit sequence type in which the STAs having the buffered traffic include respective AIDs as identifiers assigned when associating with the AP or a bitmap type in which bit values are set to specific values when bit orders correspond to the AIDs.

The method may further include, in the determining of whether there is the buffered traffic, if the type indication information indicates the bit sequence type, determining that there is the buffered traffic for the STA when the receiving STA indicator includes an AID of the STA.

The method may further include, in the determining of whether there is the buffered traffic, if the type indication information indicates the bitmap type, determining that there is the buffered traffic for the STA in a case where a bit value is set to the specific value when a bit order corresponds to the STA's AID included in the receiving STA indicator.

The method may further include, after the receiving of the data frame:

transmitting an ACK frame to the AP in response to the data frame and switching an operation state to a doze state.

The method may further include, if there is no buffered traffic for the STA, switching an operation state to a doze state.

Advantageous Effects of Invention

When providing a traffic indication map (TIM) element indicating whether there is buffered traffic for a station (STA) that operates in a doze mode, a type of the TIM element is determined on the basis of the number of STAs having buffered traffic, and the TIM element generated in this manner is provided. A size of traffic indication information included in the TIM element can be optimized, thereby being able to avoid unnecessary power consumption of an STA that operates in a power save mode.

When the size of the traffic indication information included in the TIM element is optimized, a time for occupying a radio medium by the STA that operates in the power save mode and an access point (AP) that manages a power save mode operation of the STA can be reduced, and thus overall throughput of a wireless location area network (WLAN) can be improved.

MODE FOR THE INVENTION

Figure 1:
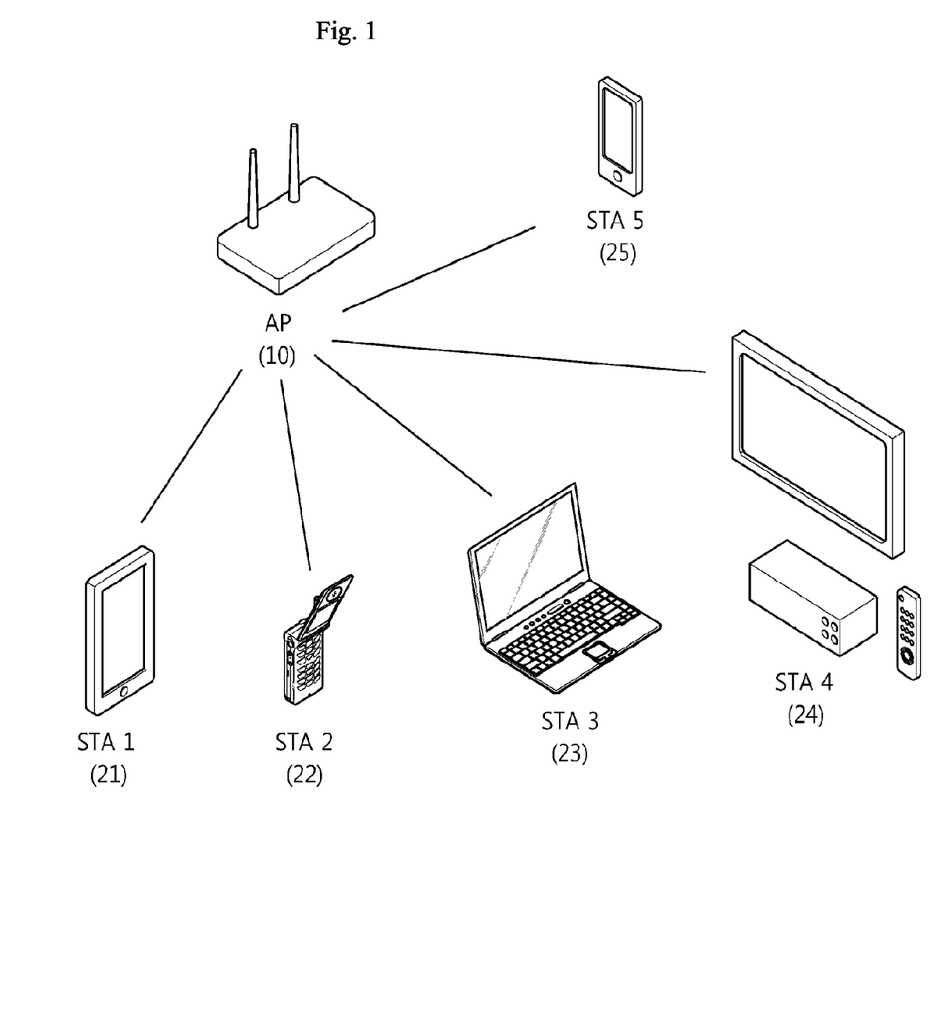
FIG. 1 is a diagram showing the configuration of a WLAN system to which embodiments of the present invention may be applied.

FIG. 1 is a diagram showing the configuration of a WLAN system to which embodiments of the present invention may be applied.

Referring to FIG. 1, a WLAN system includes one or more Basic Service Set (BSSs). The BSS is a set of stations (STAs) which can communicate with each other through successful synchronization. The BSS is not a concept indicating a specific area.

An infrastructure BSS includes one or more non-AP STAs STA1, STA2, STA3, STA4, and STA5, an AP (Access Point) providing distribution service, and a Distribution System (DS) connecting a plurality of APs. In the infrastructure BSS, an AP manages the non-AP STAs of the BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

An STA is a certain functional medium, including Medium Access Control (MAC) and wireless-medium physical layer interface satisfying the Institute of Electrical and Electronics Engineers (IEEE) 802.11 standard. Hereinafter, the STA refers to both an AP and a non-AP STA.

A non-AP STA is an STA which is not an AP. The non-AP STA may also be referred to as a mobile terminal, a wireless device, a wireless transmit/receive unit (WTRU), a user equipment (UE), a mobile station (MS), a mobile subscriber unit, or simply a user. For convenience of explanation, the non-AP STA will be hereinafter referred to the STA.

The AP is a functional entity for providing connection to the DS through a wireless medium for an STA associated with the AP. Although communication between STAs in an infrastructure BSS including the AP is performed via the AP in principle, the STAs can perform direct communication when a direct link is set up. The AP may also be referred to as a central controller, a base station (BS), a node-B, a base transceiver system (BTS), a site controller, etc.

A plurality of infrastructure BSSs including the BSS shown in FIG. 1 can be inter-connected by the use of the DS. An extended service set (ESS) is a plurality of BSSs connected by the use of the DS. APs and/or STAs included in the ESS can communicate with each another. In the same ESS, an STA can move from one BSS to another BSS while performing seamless communication.

In FIG. 1, an association TD (ATD) can be assigned to each of STAs 21, 22, 23, 24, and 25 while the STAS are associated with an AP 10. The AID is used uniquely in one BSS. For example, in a current WLAN system, the AID can be given to any one of values 1 to 2007. In this case, for the AID, 14 bits can be assigned to a frame transmitted by the AP and/or the STA, and the AID value can be given to up to 16383. In this case, 2008 to 16383 may be reserved.

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. In this type of access mechanism, an AP and/or an STA senses a wireless channel or medium before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration for medium access.

The CSMA/CA mechanism also includes virtual carrier sensing in addition to physical carrier sensing in which the AP and/or the STA directly senses the medium. The virtual carrier sensing is designed to compensate for a problem that can occur in medium access such as a hidden node problem. For the virtual carrier sending, the MAC of the WLAN system uses a network allocation vector (NAV). The NAV is a value transmitted by an AP and/or an STA, currently using the medium or having a right to use the medium, to another AP or another STA to indicate a remaining time before the medium returns to an available state. Therefore, a value set to the NAV corresponds to a period reserved for the use of the medium by an AP and/or an STA transmitting a corresponding frame.

An IEEE 802.11 MAC protocol, together with a DCF, provides a Hybrid Coordination Function (HCF) based on a Point Coordination Function (PCF) in which a reception AP or a reception STA or both periodically poll a data frame using the DCF and a polling-based synchronous access scheme. The HCF includes Enhanced Distributed Channel Access (EDCA) in which a provider uses an access scheme for providing a data frame to a number of users as a contention-based scheme and HCF Controlled Channel Access (HCCA) employing a non-contention-based channel access scheme employing a polling mechanism. The HCF includes a medium access mechanism for improving the Quality of Service (QoS) of a WLAN and can transmit QoS data both in a Contention Period (CP) and a Contention-Free Period (CFP).

Meanwhile, if channel sensing is always performed for frame transmission and reception, it causes persistent power consumption of the STA. Since power consumption in a reception state is not much different from power consumption in a transmission state, if the reception state needs to be continuously maintained, relatively great power consumption is generated in an STA that operates by using a battery. Therefore, when the STA senses a channel by persistently maintaining a reception standby state in a WLAN system, ineffective power consumption may be caused without a special synergy effect in terms of a WLAN throughput, and thus it may be inappropriate in terms of power management.

To compensate for the problem above, the WLAN system supports a power management (PM) mode of the STA.

A power management (PM) mode of a STA is classified into an active mode and a power save (PS) mode in a WLAN system. Basically, the STA operates in the active mode. When operating in the active mode, the STA can operate in an awake state so that a frame can be received all the time.

When operating in the PS mode, the STA operates by transitioning between a doze state and the awake state. When operating in the doze state, the STA operates with minimum power, and does not receive a radio signal, including a data frame, transmitted from an AP. In addition, the STA operating in the doze state does not perform channel sensing.

The longer the STA operates in a doze state, the less the power consumption is, and thus the longer the STA operates. However, since a frame cannot be transmitted and received in the doze state, the STA cannot operate long unconditionally. If the STA operating in the doze state has a frame to be transmitted to the AP, the STA can transition to an awake state to transmit the frame. However, if the AP has a frame to be transmitted to the STA operating in the doze state, the STA cannot receive the frame and cannot know that there is the frame to be received. Therefore, the STA may need to know whether there is the frame to be transmitted to the STA, and if the frame exists, may require an operation for transitioning to the awake state in accordance with a specific period. According to this operation, the AP can transmit the frame to the STA. This will be described with reference to FIG. 2.

Figure 2:
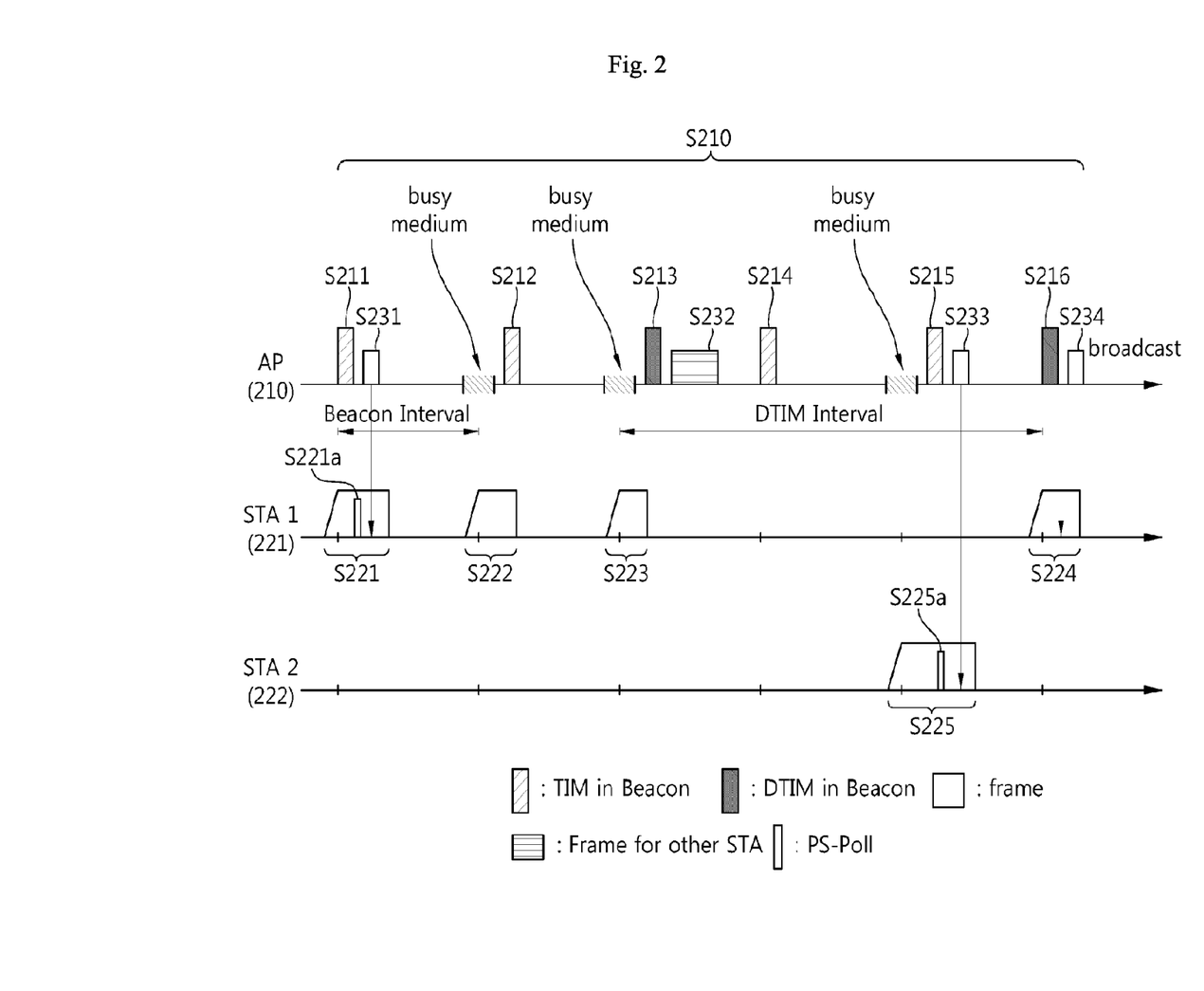
FIG. 2 shows an example of a power management operation.

FIG. 2 shows an example of a power management operation.

Referring to FIG. 2, an AP 210 transmits a beacon frame to STAs in a BSS in accordance with a specific period (step S210). The beacon frame includes a traffic indication map (TIM) information element. The TIM element includes information for reporting that the AP 210 has buffered traffic for which the STAs associated with and a frame will be transmitted. Examples of the TIM element include a TIM used to report a unicast frame and a delivery traffic indication map (DTIM) used to report a multicast or broadcast frame.

The AP 210 transmits the DTIM one time whenever a beacon frame is transmitted three times.

An STA1 221 and an STA2 222 are STAs operating in a PS mode. The STA1 221 and the STA2 222 can be configured such that they can transition from a doze state to an awake state in every wakeup interval of a specific period to receive the TIM element transmitted by the AP 210.

A specific wakeup interval can be configured such that the STA1 221 transitions to the awake state in every beacon interval to receive the TIM element. Therefore, the STA1 221 transitions to the awake state (step S221) when the AP 210 transmits a first beacon frame (step S211). The STA1 221 receives the beacon frame and acquires the TIM element. If the acquired TIM element indicates that there is a frame to be transmitted to the STA1 221, then the STA1 221 transmits to the AP 210 a PS poll frame that requests the AP 210 to transmit a frame (step S221a). The AP 210 transmits the frame to the STA1 221 in response to the PS poll frame (step S231). Upon completion of frame reception, the STA1 221 operates by transitioning back to the doze state.

When the AP 210 transmits a second beacon frame, a medium is busy, that is, another device accesses to the medium for example. Thus, the AP 210 may not be able to transmit the beacon frame in accordance with a correct beacon interval but may transmit it at a delayed time point (step S212). In this case, the STA1 221 switches its mode to the wake state in accordance with the beacon interval, but cannot receive the beacon frame transmitted with delay, and thus transitions back to the doze state (step S222).

When the AP 210 transmits a third beacon frame, the beacon frame may include a TIM element which is configured as a DTIM. However, since the medium is busy, the AP 210 transmits the beacon frame with delay (step S213). The STA1 221 operates by transitioning to the awake state in accordance with the beacon interval, and can acquire the DTIM by using the beacon frame transmitted by the AP 210. The DTIM acquired by the STA1 221 indicates that there is no frame to be transmitted to the STA1 221 and there is a frame for another STA. Therefore, the STA1 221 operates by transitioning back to the doze state. After transmitting the beacon frame, the AP 210 transmits the frame to a corresponding STA (step S232).

The AP 210 transmits a fourth beacon frame (step S214). However, since the STA1 221 cannot acquire information indicating that there is buffered traffic for the STA1 221 by receiving the TIM element two times, the STA1 221 may regulate a wakeup interval for receiving the TIM element.

Alternatively, if signaling information for regulating a wakeup interval value of the STA1 221 is included in the beacon frame transmitted by the AP 210, the wakeup interval value of the STA1 221 may be regulated. Instead of transitioning an operation state for every beacon interval to receive the TIM element, the STA1 221 can be configured in the present embodiment such that the operation state is transitioned one time for every three beacon intervals. Therefore, the STA1 221 cannot acquire a corresponding TIM element since the AP 210 transmits the fourth beacon frame (step S214), and maintains the doze state when a fifth beacon frame is transmitted (step S215).

When the AP 210 transmits a sixth beacon frame (step S216), the STA1 221 operates by transitioning to the awake state, and acquires the TIM element included in the beacon frame (step S224). The TIM element is a DTIM that indicates existence of a broadcast frame, and thus the STA1 221 receives the broadcast frame transmitted by the AP 210 (step S234) instead of transmitting a PS poll frame to the AP 210.

Meanwhile, the wakeup interval assigned to the STA2 222 may have a longer period than that of the STA1 221. Therefore, the STA2 222 can receive the TIM element by transitioning to the awake state (step S225) when the fifth beacon frame is transmitted (step S215). The STA2 222 knows existence of a frame to be transmitted to the STA2 222 by using the TIM element, and transmits a PS poll frame to the AP 210 to request transmission (step S225*a*). The AP 210 transmits a frame to the STA2 222 in response to the PS poll frame (step S233).

In order to operate the PS mode of FIG. 2, the TIM element includes a TIM that indicates whether there is a frame to be transmitted to the STA or a DTIM that indicates whether there is a broadcast/multicast frame. The DTIM may be implemented by configuring a field of the TIM element.

Figure 3:
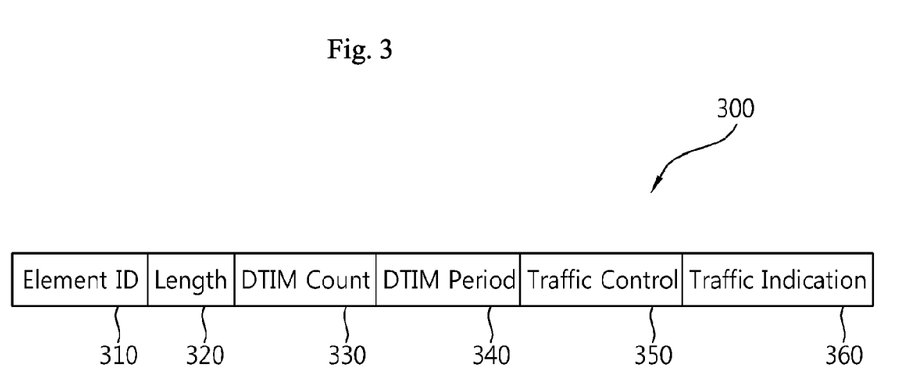
FIG. 3 shows an example of a TIM element format.

FIG. 3 shows an example of a TIM element format.

Referring to FIG. 3, a TIM element 300 includes an element ID field 310, a length field 320, a DTIM count field 330, a DTIM period field 340, a traffic control field 350, and a traffic indication field 360.

The element ID field 310 is a field indicating that a corresponding information element is a TIM element. The length field 320 indicates a total length including this field and its subsequent fields. A maximum value may be 255, and its unit may be set to an octet value.

The DTIM count field 330 informs whether a current TIM element is a DTIM. If it is not the DTIM, the DTIM count field 330 indicates the number of remaining TIM elements until the DTIM is transmitted. The DTIM period field 340 indicates a period according to which the DTIM is transmitted. The DTIM transmission period may be set to a multiple of the number of times of transmitting a beacon frame.

The traffic control field 350 and the traffic indication field 360 indicate whether there is buffered traffic or pending traffic for a specific STA. A $1^{st}$ bit of the traffic control field 350 indicates whether there is a multicast/broadcast frame to be transmitted. The remaining bits are set to indicate an offset value for interpreting the subsequent traffic indication field 360.

The traffic indication field 360 is set to a value that indicates whether there is a frame to be transmitted to each STA. This may be set in a bitmap format in which a bit value corresponding to an AID value of the specific STA is set to 1. According to an AID order, bits can be assigned from 1 to 2007 in sequence. For example, if a $4^{th}$ bit is set to 1, it implies that traffic to be transmitted to an STA having an AID of 4 is buffered in an AP.

Meanwhile, when setting a bit sequence of the traffic indication field 360, it may be ineffective to use all bit sequences that constitute a bitmap in a situation where there are many consecutive zero bits. For this, offset information for the traffic indication field 360 may be included in the traffic control field 350.

Figure 4:
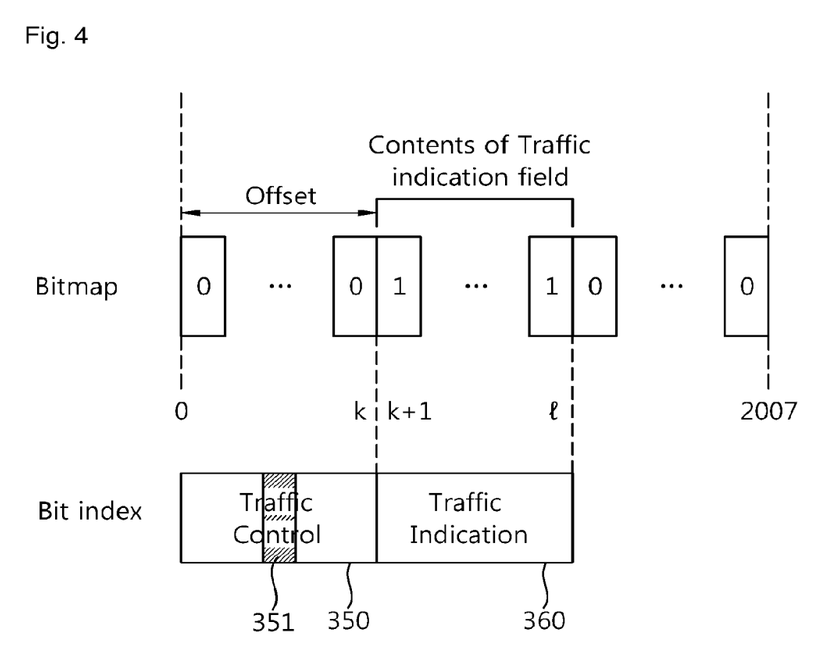
FIG. 4 shows an example of a traffic control field and a traffic indication field according to an embodiment of the present invention.

FIG. 4 shows an example of a traffic control field and a traffic indication field according to an embodiment of the present invention.

Referring to FIG. 4, a bitmap sequence that constitutes a traffic indication field 360 indicates whether there is buffered traffic for an STA having an AID corresponding to a bitmap index thereof. The bitmap sequence constitutes indication information for AIDs from 0 to 2007.

The bitmap sequence can be configured such that 0 is set consecutively from an initial bit to a $k^{th}$ bit. In addition, the bitmap sequence can be configured such that 0 is set consecutively from an $i^{th}$ bit to a last bit. This indicates that there is no buffered traffic for each of STAs assigned with AIDs 0 to k and each of STAs assigned with AIDs i to 2007. As such, a size of the TIM element can be decreased in such a manner that offset information is provided for consecutive zero sequences from 0 to k located in a first portion of the bitmap sequence and by omitting consecutive zero sequences located in a last portion thereof.

For this, a traffic control field 350 may include a traffic offset subfield 351 including offset information of consecutive zero sequences of the bitmap sequence. The traffic offset subfield 351 can be set to indicate k. The traffic indication field 360 can be set to include bits from a $(k+1)^{th}$ bit to a $(i-1)^{th}$.

Figure 5:
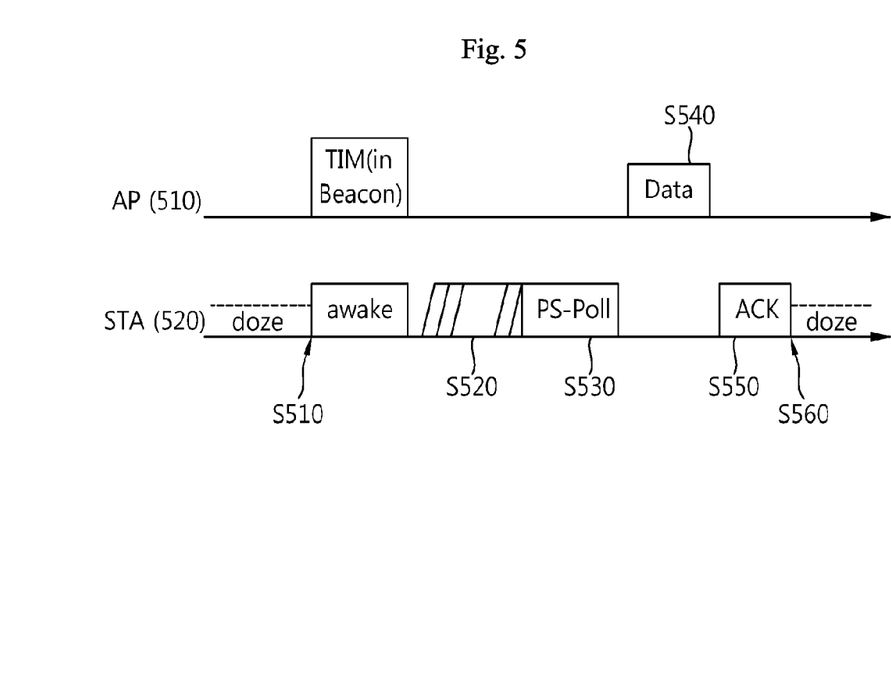
FIG. 5 shows an example of a response procedure of an AP in a TIM protocol.

FIG. 5 shows an example of a response procedure of an AP in a TIM protocol.

Referring to FIG. 5, an STA 520 switches its operation state from a doze state to an awake state to receive a beacon frame including a TIM from an AP 510 (step S510). The STA 520 interprets a received TIM element and thus can know whether there is buffered traffic to be delivered to the STA 520.

The STA 520 contends with other STAs to access to a medium for transmitting a PS poll frame (step S520), and transmits the PS poll frame to request the AP 510 to transmit a data frame (step S530).

Upon receiving the PS poll frame transmitted by the STA 520, the AP 510 transmits a data frame to the STA 520. The STA2 520 receives the data frame, and transmits an acknowledgment (ACK) frame to the AP 510 in response thereto (step S550). Thereafter, the STA2 520 switches its operation mode back to the doze state (step S560).

Instead of immediate response of FIG. 5 in which the data frame is transmitted immediately after receiving the PS poll frame from the STA, the AP may transmit data at a specific time point after receiving the PS poll frame.

Figure 6:
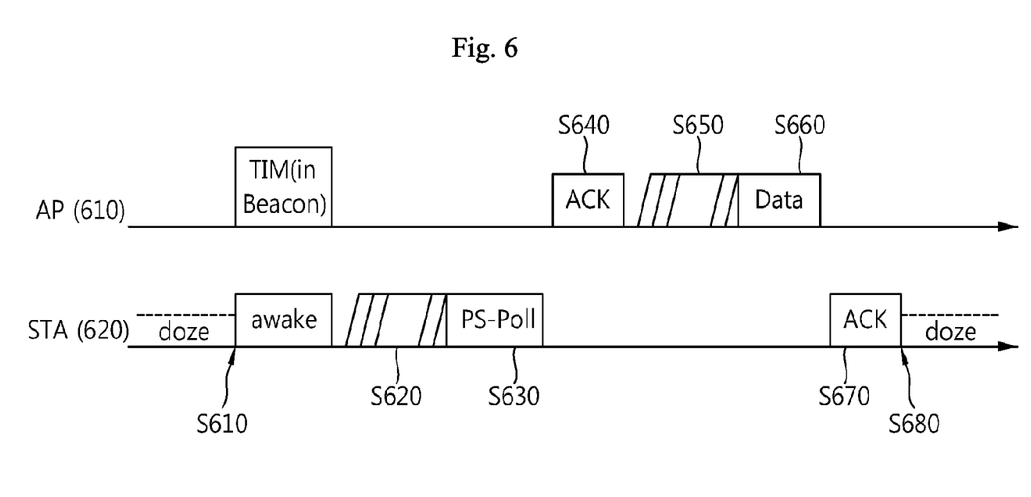
FIG. 6 shows another example of a response procedure of an AP in a TIM protocol.

FIG. 6 shows another example of a response procedure of an AP in a TIM protocol.

Referring to FIG. 6, an STA 620 switches its operation state from a doze state to an awake state to receive a beacon frame including a TIM from an AP 610 (step S610). The STA 620 interprets a received TIM element and thus can know whether there is buffered traffic to be delivered to the STA 620.

The STA 620 contends with other STAs to access to a medium for transmitting a PS poll frame (step S620), and transmits the PS poll frame to request the AP 610 to transmit a data frame (step S630).

If the AP 610 receives the PS poll frame but fails to prepare for a data frame during a specific time interval such as a short inter-frame space (SIFS), instead of directly transmitting the data frame, the AP 610 transmits an ACK frame to the STA 620 (step S640). This is a characteristic of a deferred response which is different from step S540 of FIG. 5 in which the AP 510 directly transmits the data frame to the STA 520 in response to the PS poll frame.

The AP 610 performs contending when the data frame is prepared after transmitting the ACK frame (step S650), and transmits the data frame to the STA 620 (step S660).

The STA 620 transmits an ACK frame to the AP 610 in response to the data frame (step S670), and switches its operation mode to the doze state (step S680).

When the AP transmits a DTIM to the STA, a subsequent procedure of a TIM protocol may differ.

Figure 7:
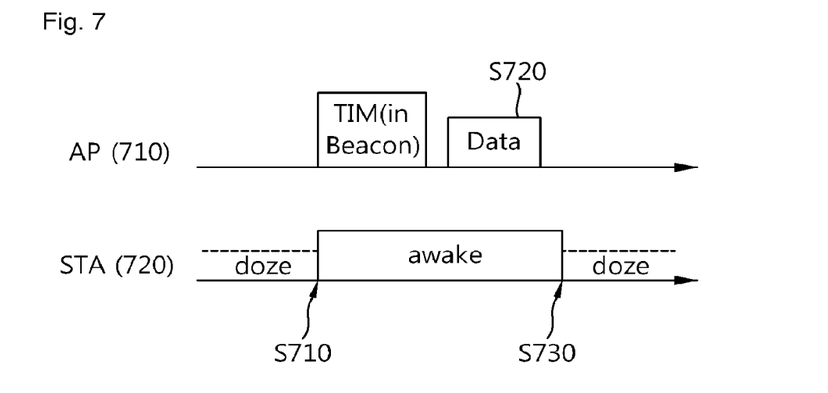
FIG. 7 shows a procedure of a TIM protocol based on a DTIM.

FIG. 7 shows a procedure of a TIM protocol based on a DTIM.

Referring to FIG. 7, an STA 720 switches its operation state from a doze state to an awake state to receive a beacon frame including a TIM from an AP 710 (step S710). The STAs 720 can know that a multicast/broadcast frame will be transmitted by using the received DTIM.

After transmitting a beacon frame including the DTIM, the AP 720 transmits the multicast/broadcast frame (step S720). After receiving the multicast/broadcast frame transmitted by the AP 710, the STAs 720 switch the operation state back to the doze state.

Meanwhile, machine to machine (M2M) is drawing attention recently as a next generation communication technique. A standardization work is ongoing to support a WLAN communication protocol supported in such a communication environment. However, the TIM protocol of FIG. 3 to FIG. 7 has requirements to apply an M2M application to the WLAN.

First, when the M2M application is applied to this WLAN environment, the number of STAs associated with one AP may be too many. Therefore, the number of associated STAs may be a maximum possible supportable number (i.e., 2007) or higher, and thus a size of a traffic indication field of the TIM element is increased.

Second, there are many applications that support a low transfer speed in the M2M. Therefore, when a large-sized traffic indication field is transmitted at a low speed, a significantly great transmission time is required and thus a power consumption of STAs is increased.

Third, most of STAs that support the M2M have traffic in which a small amount of data is exchanged periodically. Since its periodicity is very long, the number of STAs having a frame to be received from the AP during one beacon period is very small.

Considering the above three cases, a method for effectively compressing and providing information is required in a case where the traffic indication field of a bitmap type has a great size and most of bits are set to 0. Similarly to the previous embodiment, a method in which offset information is provided while omitting consecutive zero sequences located in a first portion of the bitmap sequence is ineffective when a small number of STAs have buffered traffic and a difference of assigned AIDs is great. For example, if there is buffered traffic for two STAs having AIDs of 10 and 2000, a bitmap length is 1991 and bits between the both ends can be all set to 0 except for the both ends. It is not much problematic when the number of associated STAs is small, but when the number of STAs is increased and thus a great AID is assigned, a probability of occurrence of the above case is great. Dozens of STAs are associated with the AP in a typical WLAN environment, whereas the number of associated STAs is sharply increased when M2M is supported. Therefore, a TIM protocol considering such a characteristic is required.

In a case where a plurality of STAs are associated with the AP and a small number of STAs have buffered traffic, instead of using the old bitmap-type traffic indication filed included in the TIM element, a traffic indication field including information that directly indicates an AID of a corresponding STA may be used. In the aforementioned embodiment, if the bitmap type is used, 1991 bits are required from 10 to 2000, whereas in case of directly signaling the AID, only 4 bytes are required since the AID is 2 bytes. That is, the less the STAs to be reported, the more effective the method of directly reporting the AID.

Meanwhile, in the TIM protocol based on the method of directly reporting the AID, the size of the traffic indication field is linearly increased in proportion to the number of STAs having buffered traffic. On the other hand, in case of the bitmap-type traffic indication field, since a size thereof is determined by a minimum AID value and a maximum AID value, the bit size is no longer increased even if an AID value between the maximum and minimum AID values is additionally reported. Therefore, a probability that the size of the traffic indication field is increased is low even if the number of STAs is increased.

Since the size of the traffic indication field is variable depending on a type of information included in the traffic indication field, a method in which the AP can selectively use an information type according to a given wireless environment will be proposed. In this case, the format of the TIM element proposed in the previous embodiment can be used by maintaining the format to the maximum extent possible.

A type indication field indicating the information type included in the traffic indication field may be additionally included in the TIM element. The type indication field may be a 1 bit field. For example, if it is set to '0', the traffic indication field is set to directly indicate an AID, and if it is set to '1', the traffic indication field is set in the bitmap type. The STA can interpret a type indication field value to confirm types of a traffic control field and a traffic indication field.

The type indication field can be implemented by using a reserved value of the DTIM period field of the TIM element of FIG. 2. Subsequent operations of the TIM protocol are not defined when a DTIM period field value is set to 0. Therefore, if the DTIM period field value is 0, it may imply that the traffic indication field directly indicates the AID, and if the DTIM period field value is set to another value, it may imply that the traffic indication field is set in the bitmap type. If the DTIM period field is set to a value other than 0, it can be interpreted such that the DTIM period field indicates the DTIM period similarly to the conventional case. However, if the DTIM field period is 0, there is a need to add a field for additionally reporting the DTIM period. The TIM element may have the format of FIG. 8 when using the method of directly reporting the AID by considering the above aspect.

Figure 8:
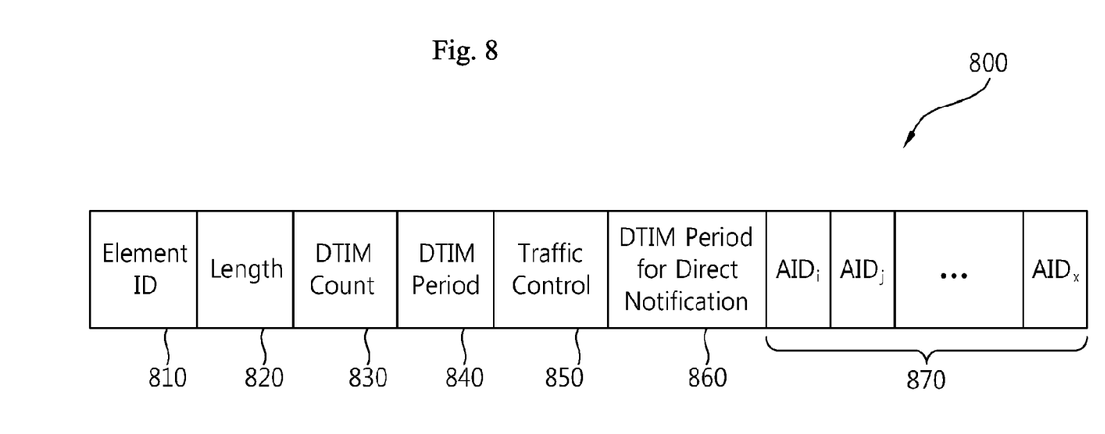
FIG. 8 shows an example of a TIM element format according to an embodiment of the present invention.

FIG. 8 shows an example of a TIM element format according to an embodiment of the present invention.

Referring to FIG. 8, a TIM element 800 includes an element ID field 810, a length field 820, a DTIM count field 830, a DIM period field 840, a traffic control field 850, a DTIM period for direct notification field 860, and a traffic indication field 870.

The DIM period field 840 is set to a value '0' which indicates that the traffic indication field 870 includes information directly indicating an AID of an STA.

A 1st bit of the traffic control field 850 is used as information indicating whether there is a multicast/broadcast frame. Thereafter, the remaining bits used to indicate an offset can be set to 0 since they are meaningless when using a method of directly indicating the AID of the STA.

The DTIM period for direct notification field 860 is set to indicate an actual DTIM period.

The traffic indication field 870 is set such that AIDs of STAs having buffered traffic are included one by one with a length of 2 bytes.

A method for a power management operation based on the TIM protocol according to the aforementioned proposed embodiment will be described below with reference to FIG. 9.

Figure 9:
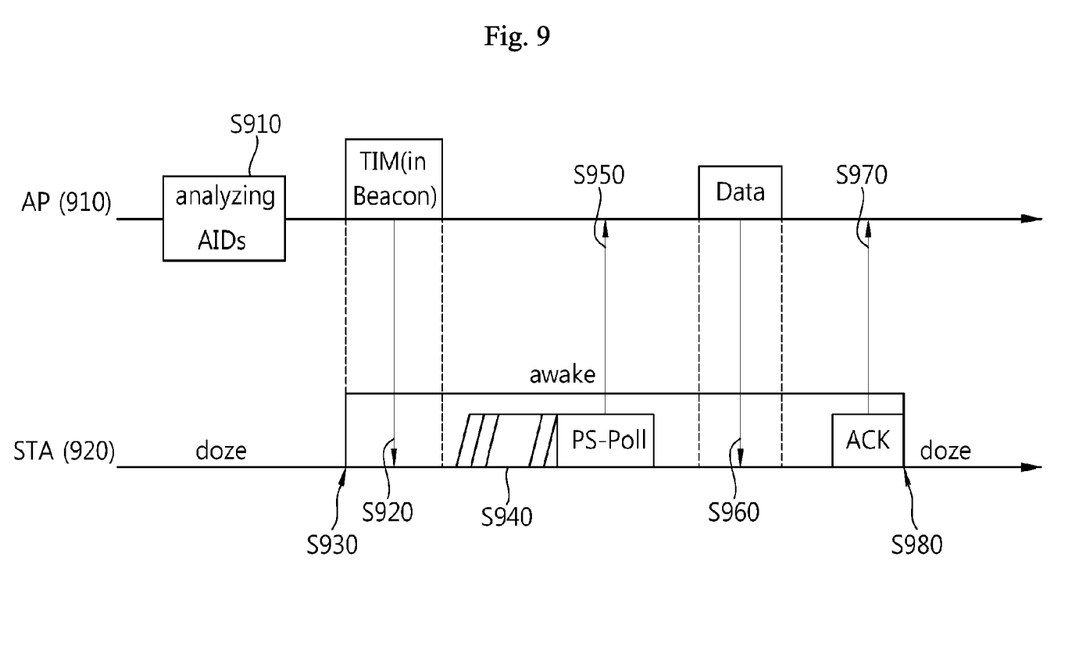
FIG. 9 shows a method for a power management operation according to an embodiment of the present invention.

FIG. 9 shows a method for a power management operation according to an embodiment of the present invention.

Referring to FIG. 9, an AP 910 analyzes AIDs of STAs for currently buffered traffic before generating a TIM element of a beacon frame (step S910). A traffic indication field type is determined based on a bitmap sequence size which is a difference between a minimum AID and a maximum AID on the basis of the number of AIDs having buffered traffic.

For example, if the bitmap sequence size is greater than a value obtained by multiplying the number of AIDs by 16, it is more effective to directly report the AID. Therefore, LSB 7 bits of a DTIM period field and a traffic control field are set to 0, and a DTIM period value is set in the DTIM period for direct notification field. The traffic indication field is a bit sequence when each of AIDs of STAs which are targets of frame transmission has 2 bytes, and can be configured such that bit sequences are consecutive to each other.

On the contrary, if the bitmap sequence size is less than the value obtained by multiplying the number of AIDs by 16, it is more effective to transmit the bitmap-type traffic indication field by including it into the TIM.

Upon analyzing the AIDs of the STAs, the AP 910 generates a TIM element including a traffic indication field having a type determined in step S910, and transmits the generated TIM element to an STA 920 by carrying the generated TIM element on a beacon frame (step S920).

The STA 920 switches its operation state to an awake state to receive the beacon frame at a predetermined time (step S930), and receives the TIM element transmitted by the AP 920 (step S920). The STA 920 can interpret the traffic indication field included in the TIM element to determine whether there is a frame to be transmitted to the STA 920.

If the traffic indication field is a type that includes the buffered STA's AID, the STA 920 can know whether there is a frame to be transmitted to the STA 920 according to whether the AID assigned to the STA 920 is included in the traffic indication field. Taking the TIM element format of FIG. 8 for example, if the DTIM period field value is 0, the traffic control field 850 is used to determine only whether there is a multicast/broadcast frame, and the DTIM period can be stored by being detected from the DTIM period for direct notification field 860. To determine whether its AID is included, a bit sequence constituting the subsequently transmitted traffic indication field 870 can be analyzed by dividing it by 2 bytes. If its AID is not included, the operation mode can be directly switched to the doze state.

If the traffic indication field is a bitmap type, the STA 920 can interpret an offset value included in the traffic control field and bitmap information included in the traffic indication field, and thus can know whether there is a frame to be transmitted to the STA 920 according to a bit value matched to an AID assigned to the STA 920. Taking the TIM element format of FIG. 8 for example, if a value that is set in the DTIM period field 850 is not 0, the value is stored as a DTIM period value. The traffic control field 860 can be used to know whether a multi-cast/broadcast frame exists and to acquire offset information of a bitmap sequence constituting the traffic indication field 880. When interpreting the traffic indication field 880, a full bitmap sequence can be interpreted by adding zeros as many as indicated by the offset information included in the traffic control field 860 located before the bitmap sequence, and it can be known whether there is a frame to be transmitted. If a bit order corresponding to its AID is set to 0, the operation mode can be switched to the doze state.

When it is confirmed that there is a frame to be transmitted to the STA 920, the STA 920 performs a contention step for medium access (step S940). The STA 920 needs to transmit a message for requesting the AP 910 to transmit a frame, and a medium access right for this can be acquired by contending with another STA or the AP. When the medium access right is acquired in the contending step (step S940), the STA 920 transmits a PS poll frame to request the AP 910 to transmit a data frame (step S950).

Upon receiving the PS poll frame from the STA 920, the AP 910 transmits a data frame to the STA 920 in response thereto (step S960). In order to report to the AP 910 that data reception is normally performed, the STA 920 transmits an ACK frame (step S970) and switches its operation state to the doze state (step S980).

Although it is shown in FIG. 9 that the number of STAs which receive the TIM element from the AP and to which the data frame is transmitted is one, a plurality of STAs may receive the TIM elements. A process of receiving a data frame by the STAs from the AP can be performed in sequence, and can be implemented in such a manner that each STA repeats the contending step S940, the PS poll frame transmission step S950, the data frame receiving step S960, and the ACK frame transmitting step S970 of FIG. 9. In addition, after receiving the PS poll frame from the STA, the AP can perform the ACK frame transmitting step S640, the contending step S650, and the data frame transmitting step S660 of FIG. 6.

Figure 10:
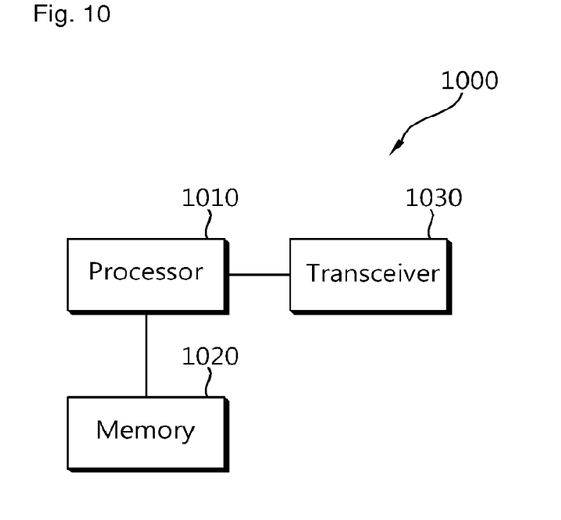
FIG. 10 is a block diagram showing a wireless apparatus according to the embodiments of the present invention may be implemented.

FIG. 10 is a block diagram showing a wireless apparatus according to the embodiments of the present invention may be implemented.

Referring to FIG. 10, the wireless apparatus 1000 includes a processor 1010, memory 1020, and a transceiver 1030. The transceiver 1030 transmits and/or receives a radio signal and implements the physical layer of the IEEE 802.11 standard. The processor 1010 operably coupled to the transceiver 1030 analyzes AIDs of STAs, creates a TIM element, and transmits/receives the TIM element. The processor 1010 implements a MAC layer and/or a PHY layer for implementing embodiments of the present invention shown in FIG. 2 to FIG. 9 for transmitting a data frame. The processor 1010 can be configured such that the TIM element is created in another type based on the AIDs of the STAs. Further, the processor 1010 can be configured such that the TIM element is analyzed to determine whether there is a data frame to be transmitted and to determine which operation is performed between a data frame request operation and an operation state transitioning operation.

The processor 1010 and/or the transceiver 1030 may include an application-specific integrated circuit (ASIC), a separate chipset, a logic circuit, and/or a data processing unit. When the embodiment of the present invention is implemented in software, the aforementioned methods can be implemented with a module (i.e., process, function, etc.) for performing the aforementioned functions. The module may be stored in the memory 1020 and may be performed by the processor 1010. The memory 1020 may be located inside or outside the processor 1010, and may be coupled to the processor 1110 by using various well-known means.

The invention claimed is:

1. A method for indicating a traffic in a wireless local area network, the method comprising:
   generating, by an access point (AP), a traffic indication map (TIM) element; and
   transmitting, by the AP, the TIM element,
   wherein the TIM element includes indication information and a traffic indication field,
      the indication information indicating a format of the traffic indication field,
      the traffic indication field indicating whether there are buffered traffics for stations associated with the AP in accordance with the format of the traffic indication field indicated by the indication information.

2. The method of claim 1, wherein, if the indication information indicates a first format, the traffic indication field includes information about an association identifier (AID) identifying a target station for which the AP has buffered traffic.

3. The method of claim 2, wherein, if the indication information indicates the first format, the traffic indication field does not include information about a station for which the AP does not have buffered traffic.

4. The method of claim 2, further comprising:
   receiving, by the AP, a power save poll frame for requesting the buffered traffic from the target station.

5. The method of claim 1, wherein, if the indication information indicates a second format, the traffic indication field includes a bitmap including a plurality of bits, and
   wherein each of the plurality of bits corresponds to a corresponding one of a plurality of stations and indicates whether there is buffered traffic for a corresponding station at the AP.

6. The method of claim 1, wherein the TIM element further includes a traffic control field indicating whether a multicast data is buffered at the AP.

7. A device for a wireless local area network, the device comprising:
   a transceiver configured to receive and transmit radio signals; and
   a processor operatively coupled with the transceiver and configured to:
   generate a traffic indication map (TIM) element; and
   instruct the transceiver to transmit the TIM element,
   wherein the TIM element includes indication information and a traffic indication field,
      the indication information indicating a format of the traffic indication field,
      the traffic indication field indicating whether there are buffered traffics for stations associated with the device in accordance with the format of the traffic indication field indicated by the indication information.

8. The device of claim 7, wherein, if the indication information indicates a first format, the traffic indication field includes information about an association identifier (AID) identifying a target station for which the device has buffered traffic.

9. The device of claim 8, wherein, if the indication information indicates the first format, the traffic indication field does not include information about a station for which the device does not have buffered traffic.

10. The device of claim 8, wherein the processor is configured to:
    instruct the transceiver to receive a power save poll frame for requesting the buffered traffic from the target station.

11. The device of claim 7, wherein, if the indication information indicates a second format, the traffic indication field includes a bitmap including a plurality of bits, and
    wherein each of the plurality of bits corresponds to a corresponding one of a plurality of stations and indicates whether there is buffered traffic for a corresponding station at the device.

12. The device of claim 7, wherein the TIM element further includes a traffic control field indicating whether a multicast data is buffered at the device.

* * * * *